Feb. 13, 1923.
J. F. FOSTER.
ROLLER BEARING CAGE.
FILED NOV. 20, 1919.
1,444,964
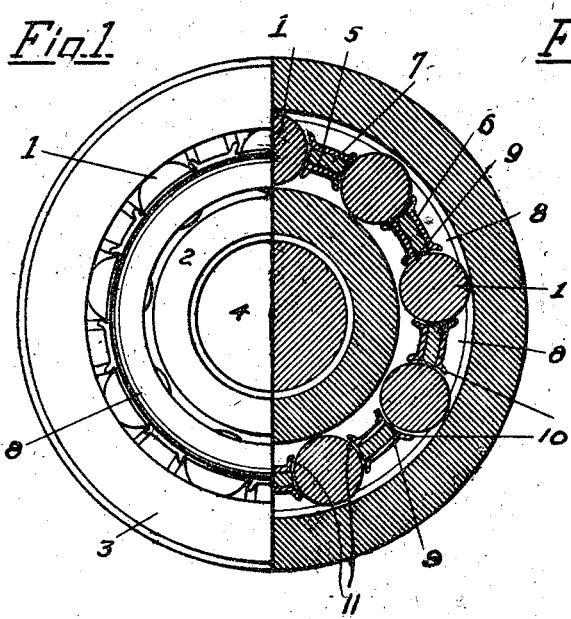
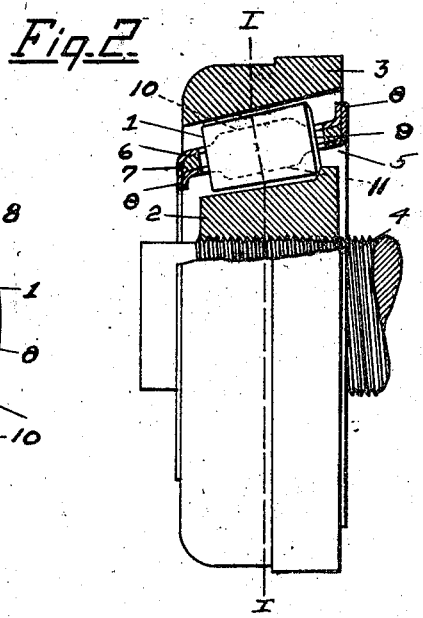
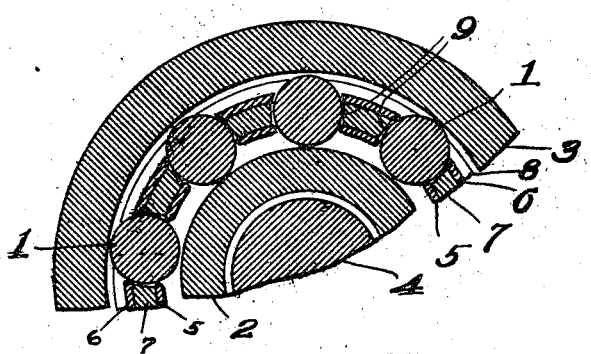
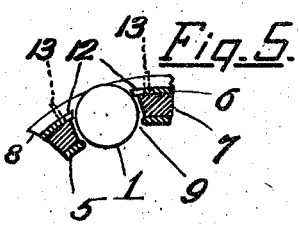
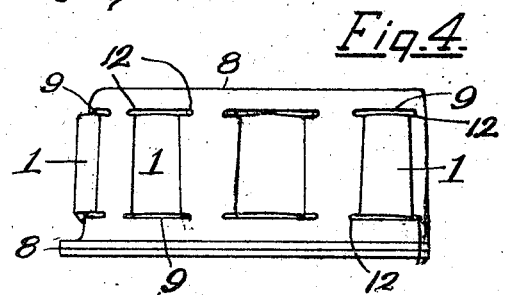
INVENTOR.
John F. Foster.
BY
George J. Thorpe
ATTORNEY.

Patented Feb. 13, 1923.

1,444,964

UNITED STATES PATENT OFFICE.

JOHN F. FOSTER, OF FORT MADISON, IOWA.

ROLLER-BEARING CAGE.

Application filed November 20, 1919. Serial No. 339,373.

*To all whom it may concern:*

Be it known that I, JOHN F. FOSTER, a citizen of the United States, residing at Fort Madison, in the county of Lee and State of Iowa, have invented certain new and useful Improvements in Roller-Bearing Cages, of which the following is a specification.

This invention relates to roller bearings, and more especially to bearings composed of tapered or conical rollers mounted in a circular cage, and peculiarly suitable for use in the wheels of motor vehicles though susceptible of use in other connections.

Certain bearings of this type employ flanges at opposite sides of the rollers to retain the latter in position, the flanges being resilient so that cooperating pairs thereof may be sprung apart to receive between them the respective rollers, and said flanges also prevent dislocation of the rollers when the cage is not in operative position, and likewise resist lateral play or bodily twisting movements of the rollers. I have found that the lateral play or bodily twisting movements of the rollers are destructive of the flanges, and that better results in the way of strength and durability are obtained by providing a ring between the flanges, provided with openings so snugly receiving the rollers that bodily twisting thereof tending to dispose them at angles to their proper position, will be checked by the said ring instead of by the said flanges, thus protecting the latter from injury due to incessant bending or springing under the play of the rollers.

With the object therefore of producing an efficient and durable cage for roller bearings, the invention consists in certain novel and useful features of construction and combinations of parts as hereinafter described and claimed; and in order that it may be fully understood, reference is to be had to the accompanying drawing, in which:—

Figure 1, is a view partly in end elevation and partly in section on the line 1—I of Figure 2.

Figure 2, is a view partly in side elevation and partly in central vertical section.

Figure 3, is a fragmentary section showing a slightly modified form of construction.

Figure 4, is a plan view of part of the cage shown in Figure 3.

Figure 5, is a fragmental section taken in the plane of one end of a roller of Figure 4.

In the said drawing, 1 indicates the rollers of the bearing, the same being arranged in circular series and engaging the periphery of the inner sleeve 2, and the inner circumference of the outer sleeve or collar 3, the inner sleeve being adjustably mounted on the shaft 4, as shown or in any other suitable manner.

The cage for the rollers, comprises an inner conical ring 5, an outer conical ring 6 and an intermediate ring 7, the three rings being nested together and firmly secured in any approved manner against independent movement. The cage thus produced is stiffened and strengthened by the provision of marginal beads or flanges 8, formed preferably by bending the rings 5 and 6 laterally, either inward or outward, and securing them together in any proper manner.

The cage is provided with suitable equispaced openings 9, formed in the three rings for the reception of the rollers, the openings in the central ring being slightly narrower than those in the rings 5 and 6, and providing but slight clearance for the rollers to restrict lateral play and twisting movement thereof. To retain the rollers in the cage when the latter is not in operative position in the bearing, the rings 5 and 6 are respectively provided with movable portions or flanges 10 and 11, those for each roller being disposed at opposite sides of the openings occupied by such roller. The said flanges overlap the rollers sufficiently to retain them in position and must be pressed or sprung apart to permit the rollers to be inserted or removed, it being understood that a roller can be inserted or removed by moving apart cooperating flanges of the outer ring, for example.

The side walls of the central or intermediate ring and the flanges of the inner and outer rings provide contacts for the respective rollers which are substantially concentric therewith and bear such relation to such rollers as to offer opposition to any twisting or in and out movement of the rollers and thus hold them in perfect alinement and equal distances from the axis of the inner conical ring, it being noted that the intermediate ring which is flangeless, is of sufficient thickness to alone prevent appreciable twisting movements of the rollers in a direction circumferential of the conical collar.

In Figures 3, 4, and 5, where corresponding parts are similarly identified, the intermediate ring 7, is of increased thickness and the openings in the other rings are of width to guard against the rollers falling from position. In this construction, the flanges 10 and 11, are omitted, the outer ring being kerfed or slit at 12, so that the portions adjacent the sides of the rollers may be pressed or bent outwardly as at 13, to permit of the insertion or removal of the rollers, the bent portions, after the insertion of the rollers, being flattened out to conform to the body of the ring and overlap the openings in ring 7, for the purpose of retaining the rollers against dislocation. It will be noted that the width of the openings of the inner ring is such that the rollers cannot be passed therethrough. In this construction the rings 5 and 6 need not be of resilient material, but if not should be of material which will sustain bending without danger of fracture.

From the above description it will be apparent that I have produced a roller-carrying cage for roller bearings, which embodies the features of advantage set forth in the statement of the object of the invention, and which may be modified in minor particulars without departing from the principle of construction involved.

I claim:

1. In a roller bearing, three tapering rings fitting one within another, and provided with registering tapering openings of equal length, a circular series of tapering rollers fitting in said openings, the sidewalls of the latter occupying planes concentric to the axes of the respective rollers and bearing such relation thereto as to retain them in place and prevent them from twisting in any direction, the intermediate ring alone being adapted for preventing twisting movement of the rollers in a direction circumferential of the series thereof.

2. In a roller bearing, three tapering rings fitting one within another and provided with registering tapering openings of equal length, a circular series of tapering rollers fitting in said openings, the sidewalls of the latter occupying planes concentric to the axes of the respective rollers and bearing such relation thereto as to retain them in place and prevent them from twisting in any direction, the intermediate ring alone being adapted for preventing twisting movement of the rollers in a direction circumferential of the series thereof; in combination with an inner conical ring engaging the inner sides of the series of rollers, and an outer conical ring engaging the outer sides of the rollers.

3. In a roller bearing, three tapering rings fitting one within another and provided with registering tapering openings of equal length, a circular series of tapering rollers fitting in said openings, the sidewalls of the latter occupying planes concentric to the axes of the respective rollers and bearing such relation thereto as to retain them in place and prevent them from twisting in any direction, the intermediate ring alone being adapted for preventing twisting movement of the rollers in a direction circumferential of the series thereof; the outer ring having outwardly converging flanges snugly embracing the respective rollers, and the inner ring having inwardly converging flanges snugly embracing the respective rollers, the said flanges projecting from the side margins of the said openings of the respective rings.

4. In a roller bearing, three tapering rings fitting one within another and provided with registering tapering openings of equal length, a circular series of tapering rollers fitting in said openings, the sidewalls of the latter occupying planes concentric to the axes of the respective rollers and bearing such relation thereto as to retain them in place and prevent them from twisting in any direction, the intermediate ring alone being adapted for preventing twisting movement of the rollers in a direction circumferential of the series thereof; the outer ring having its circular margin of greatest diameter terminating in an outwardly-projecting circular flange, and its other circular margin terminating in an inwardly projecting circular flange, and the inner ring having its margin of smallest diameter terminating in an inwardly-projecting circular flange abutting the inner face of the inturned flange of the outer ring, and its other margin terminating in a circular outwardly-projecting flange abutting the adjacent edge or outer face of the outwardly-projecting flange of the outer ring.

In testimony whereof, I affix my signature.

JOHN F. FOSTER.